United States Patent [19]

Moretti et al.

[11] Patent Number: 4,498,024
[45] Date of Patent: Feb. 5, 1985

[54] SYNCHRONOUS ELECTRODYNAMIC MACHINE WITH PERMANENT MAGNETS AND COOLED BY A LIQUID

[75] Inventors: Antonio Moretti, Bonnelles; Louis Banon, Paris, both of France

[73] Assignee: Regie Nationale des Usines Renault, Paris, France

[21] Appl. No.: 487,015

[22] Filed: Apr. 21, 1983

[30] Foreign Application Priority Data

Apr. 23, 1982 [FR] France ................ 82 06987

[51] Int. Cl.³ .............................................. H02K 9/00
[52] U.S. Cl. .................................... 310/54; 310/156; 310/87
[58] Field of Search ...................... 310/54, 57, 60-63, 310/52, 87, 156, 43

[56] References Cited

U.S. PATENT DOCUMENTS

| | | | |
|---|---|---|---|
| 1,269,909 | 6/1918 | Cooper | 310/54 X |
| 1,448,700 | 3/1923 | Seidner | 310/54 |
| 1,958,043 | 5/1934 | Heintz | 310/156 |
| 1,996,946 | 4/1935 | Beeh | 310/156 |
| 2,059,518 | 11/1936 | Harley | 310/156 |
| 2,282,586 | 5/1942 | Hubacker | |
| 2,318,786 | 5/1943 | Korte et al. | 310/43 X |
| 2,371,193 | 3/1945 | Sigmund et al. | 310/436 |
| 2,390,130 | 12/1945 | Sigmund et al. | 310/54 |
| 2,511,854 | 6/1950 | Kane | |
| 2,876,370 | 3/1959 | Pfleuger et al. | 310/87 |
| 2,975,309 | 3/1961 | Seidner | 310/43 X |
| 3,135,888 | 6/1964 | Maynard | 310/434 |
| 3,183,384 | 5/1965 | Flaherty, Jr. et al. | 310/54 X |
| 3,502,916 | 3/1970 | Staurache | 310/59 |
| 4,327,302 | 4/1982 | Hershberger | 310/156 |

Primary Examiner—Donovan F. Duggan
Attorney, Agent, or Firm—Oblon, Fisher, Spivak, McClelland & Maier

[57] ABSTRACT

This invention has as its object an electrodynamic machine (10) cooled by a liquid contained in a housing (12) in which is mounted a stator (14) whose inner peripheral wall (16) works with the outer peripheral wall (20) of a rotor mounted to turn in the housing (12) to define between them a gap (22) in which said fluid circulates. The machine according to the invention is characterized in that the peripheral walls (16, 20) are cylindrical and wherein their surface in contact with the cooling liquid is continuous and smooth so as to minimize the energy losses due to the laminar flow of the cooling liquid.

Application to the cooling of electrodynamic machines.

9 Claims, 5 Drawing Figures

SYNCHRONOUS ELECTRODYNAMIC MACHINE WITH PERMANENT MAGNETS AND COOLED BY A LIQUID

This invention has as its object an electrodynamic machine cooled by a liquid containing a housing in which is mounted a stator whose inner peripheral wall works with the outer peripheral wall of an immersed rotor mounted to turn in the housing to define between them a gap in which said liquid circulates.

More specifically, this invention relates to synchronous electric machines excited by permanent magnets whose active stator and rotor parts are immersed in a cooling liquid.

Electrodynamic machines consist essentially of a rotor and a stator which have conductive elements which give off heat. To increase the efficiency of these machines, it is necessary to assure the dissipation of the heat given off by the resistance of the conductors to the circulation of the current and of the core losses. For this purpose, it has been proposed to cool the machines by delivery of air in the rotor slots and around the periphery of the rotor. The drawback of these systems is that the heat transfer between the conductors which give off heat and the air is insufficient to assure a proper cooling.

It has also been proposed to perform the cooling with a liquid, but the solutions adopted have not given the expected results for the following reasons: when the cooling liquid enters the gap separating the rotor and the stator, an improvement of the effectiveness of the cooling results, but the losses by braking of the rotation are significant and are the cause of power losses.

The systems which prevent the liquid from entering the gap between the rotor and stator do so by channeling the cooling fluid over a limited part of the rotor and use the transfer of the heat of the conductors to the cooling liquid by the fastening structure of these conductors. In these systems, the power losses are reduced, but the effectiveness of the cooling is low if it is compared with that obtained when the liquid is in contact with the group of hot bodies.

The cooling of the inner parts by liquid or gaseous agents necessitates also most often particular geometrical arrangements such as grooves, slots, hollow conductors, hollow shafts, so as to obtain the most effective cooling effect, which are very costly to achieve. Moreover, generally associated with these geometrical arrangements are devices for setting the cooling liquid in motion and monitoring and regulation equipment.

Machines of the synchronous type excited by permanent magnets exhibit numerous qualities that make the immersion of the active parts particularly advantageous, notably:

absence of sliding electric contacts, therefore no specific precautions to be taken for the insulation and filtering of the cooling liquid;

absence of rotor lead-out wires which would produce significant losses by stirring;

absence of rotor losses in laminated rotor machines; in a machine with a gap not immersed in a fluid of high thermal conductivity, the gap constitutes a considerable thermal resistance preventing the flow of heat from flowing out through the rotor; the rotor, therefore, does not participate in the exchange of heat, its average temperature is much higher than that of the stator.

On the other hand, the stator conductors, in contact with the gap are very poorly cooled if the gap is not immersed. Frequent meltings of these conductors result when a considerable current is imposed to obtain a strong torque.

The synchronous machines with permanent magnets today have numerous applications in the field of robots and machine tools. In these applications, the operating cycles have a considerable working time at strong torque maintained, therefore, without stirring the fluid. On the other hand, considerable torques are required at low speeds for a rapid acceleration.

Finally, with the view of becoming free of reduction gears of high ratios that are costly and not very precise, the users require machines that turn at low speed, but always with strong torque and power values. The total immersion of the active parts of the machines in a cooling fluid proves, therefore, a solution having a great future.

These various qualities make it possible to push the machine to very high current densities by opposing the formation of hot points as a result of the decrease in the thermal resistance viewed from the heat source.

The invention has as its object to propose a synchronous electrodynamic machine with permanent magnets and cooled effectively by liquid in which the operating power losses are made negligible or kept at a desired value.

For this purpose, the invention proposes an electrodynamic machine of the type described above, characterized in that the inner and outer peripheral walls of the stator and of the rotor are cylindrical and their surface in contact with the cooling liquid is continuous and smooth.

It is understood that as a result of this characteristic, the energy losses due to laminar flow of the cooling liquid are reduced to a negligible level and that the contact of this cooling liquid with the hot bodies to be cooled is greatly improved.

An embodiment of this invention will now be described by way of example with reference to the accompanying drawing in which.

Figure 1:
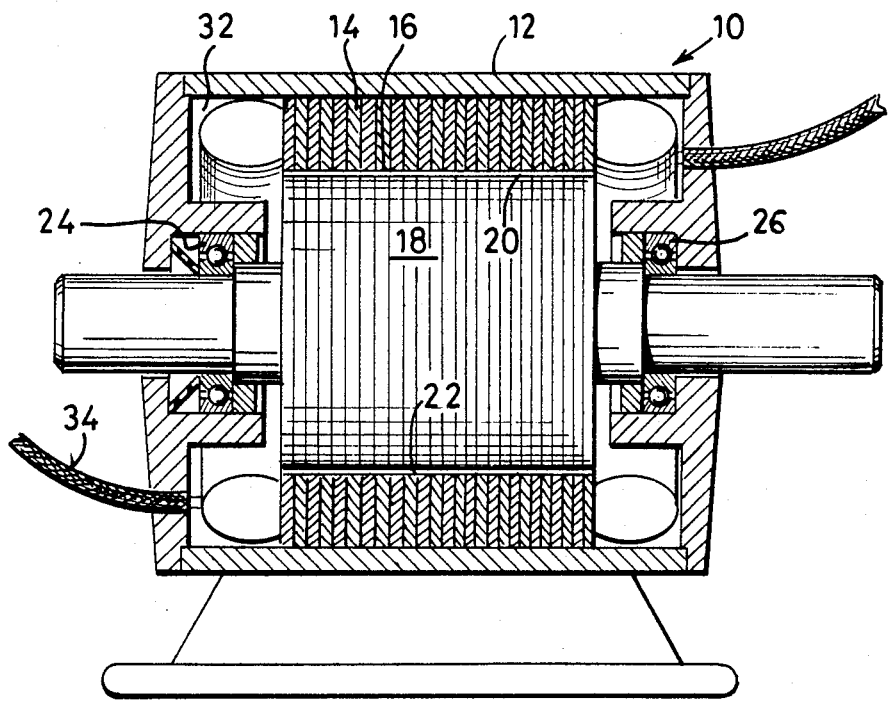
FIG. 1 is a view in axial section of an electrodynamic machine according to this invention.

Electrodynamic machine 10, represented in FIG. 1, comprises a housing 12 in which is mounted a stator 14 whose inner peripheral wall 16 works with external peripheral wall 20 of a rotor 18 mounted in housing 12 to define between them a gap 22. Rotor 18 is mounted to turn in housing 12 by means of two bearings 24 and 26 each having a roller.

Inner cavity 32 of housing 12, in which are mounted the stator 14 and the rotor 18, is filled with a cooling liquid which can be, for example, oil or water. Rotor 18 and the stator unit 14 are thus completely immersed in the cooling fluid which can be introduced in cavity 32 through pipes 34.

Figure 4:
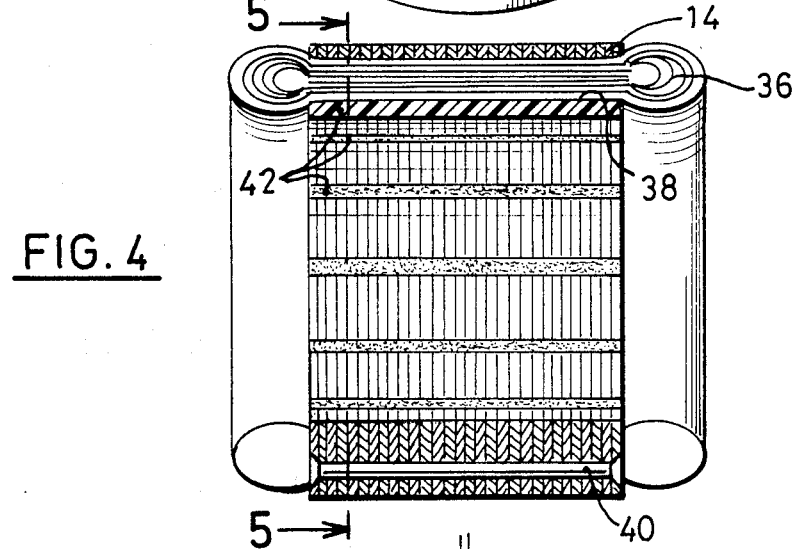
FIG. 4 is a view in axial section of the stator of the machine represented in FIG. 1.
Figure 5:
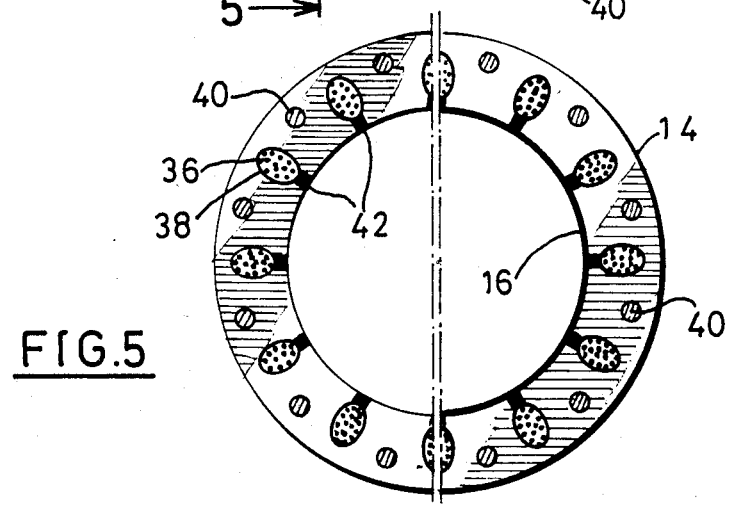
FIG. 5 is a view in section along line 5—5 of FIG. 4.

Stator 14 represented in FIGS. 4 and 5 comprises a main stator winding 36 placed in slots 38 and axial cooling channels 40 in which the cooling liquid can circulate.

According to the invention, inner peripheral wall 16 of stator 14 is cylindrical and its surface is smooth and continuous. In the embodiment represented, and as can be found in FIG. 5, inner wall 16 is obtained by duplicate molding of a material 42 which fills the parts coming out of slots 38. As a possible variant and as has been represented, on a fourth of the circumference the duplicate molding material can cover all of the inner peripheral wall of the stator. If the state of the surface thus obtained by duplicate molding is not perfect, it can be improved by a remachining of the stator 14 using any suitable means.

Figure 2:
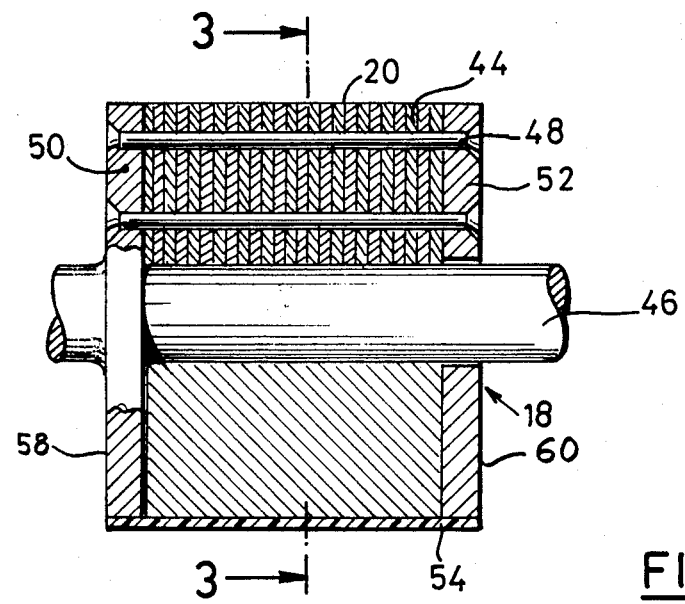
FIG. 2 is a view in axial section of the rotor of the machine represented in FIG. 1.
Figure 3:
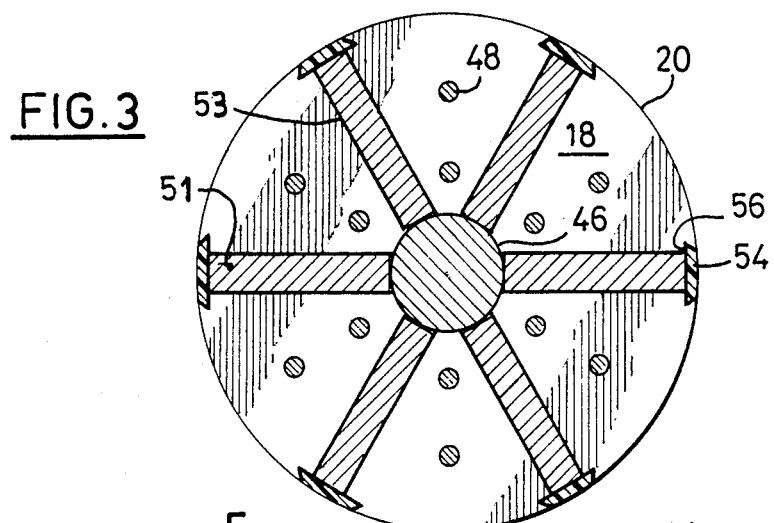
FIG. 3 is a view in section along line 3—3 of FIG. 2.

Rotor 18 represented in FIGS. 2 and 3 consists of a stack of magnetic sheets 44 slipped on a shaft 46 and kept tight by braces 48 between two nonmagnetic flanges 50 and 52. As shown, flange 50 can be one piece with shaft 16. Rotor 18 also comprises magnets 51 mounted in slots 53. Magnets 51 are held in slots 53 by elements 54 inserted in recesses 56 made in the ends of slots 53.

According to the invention, the outer peripheral wall 20 of rotor 18 is cylindrical and its surface is smooth and continuous. In the embodiment shown, smooth and continuous outer wall 20 has been obtained by duplicate molding of a material, especially in recesses 56, the duplicate molding material, in this case, consisting of elements 54. The perfect continuity of the surface has further been assured by a remachining of the outer surface of the rotor after duplicate molding.

According to another characteristic of the invention, and to improve further the cooling of the motor, the two lateral radial faces 58, 60, axially delimiting rotor 18, are smooth and continuous. In the embodiment shown, lateral faces 58 and 60 consist of the outer faces of endplates 50 and 52.

The arrangement of the shapes and surfaces defining the gap and in contact with the liquid is thus calculated so that the energy absorbed by viscous friction between the liquid and the revolving parts is less than a desired value, generally imposed by the specifications sheet, for high rotation speeds, including the maximum speed.

To assure a better cooling of the electrodynamic machine 10, it is desirable that the cooling liquid completely fill cavity 32 and that this cavity be completely purged of the air that if could contain. It is desirable to provide a device for forced circulation of the cooling liquid which makes it possible to produce a sufficient circulation speed and to assure its passage in the gap, an external heat exchanger being able to be provided on the circulation system. However, given the good cooling characteristics obtained in the machines made according to the teachings of this invention, it may be unnecessary to provide a circulation of the fluid on the outside of the housing in a heat exchanger, it is enough that pipes 34 be connected to a buffer device (not shown) that makes it possible to absorb the expansions of the cooling liquid.

What is claimed is:

1. A synchronous electrodynamic machine comprising:
   (a) a hollow cylindrical housing having an end wall at each end thereof;
   (b) a stator mounted in said housing, said stator having an inner cylindrical wall which is continuous and smooth and a plurality of axial cooling channels extending through said stator in parallel to said inner cylindrical wall;
   (c) a bearing centrally mounted in each end wall of said housing;
   (d) a rotor mounted in said bearings for rotation within said stator, said rotor having an outer cylindrical wall which is continuous and smooth, said rotor being sized, shaped, and positioned such that there is a narrow, symmetrical, annular gap between the outer cylindrical wall of said rotor and the inner cylindrical wall of said stator, said rotor comprising a plurality of radially disposed permanent magnets;
   (e) an inlet for cooling fluid in one of said end walls;
   (f) an outlet for the cooling fluid in the other of said end walls; and
   (g) means for introducing the cooling fluid into said housing through said inlet, for causing the cooling fluid to flow continuously in a single axial direction through said annular gap and said axial cooling channels, and for causing the cooling fluid to flow out of said housing through said outlet.

2. A synchronous electrodynamic machine as recited in claim 1 wherein the inner cavity of said housing is entirely filled with the cooling fluid, completely immersing said stator and said rotor.

3. A synchronous electrodynamic machine as recited in claim 1 wherein said stator comprises a main stator winding disposed in slots.

4. A synchronous electrodynamic machine as recited in claim 3 wherein:
   (a) said slots are radially oriented and communicate with the inner cylindrical wall of said stator;
   (b) said main stator winding does not extend radially inwardly to the inner cylindrical wall of said stator; and
   (c) the portions of said slots which are not filled by said main stator winding are filled by a molded material.

5. A synchronous electrodynamic machine as recited in claim 1 wherein the inner cylindrical wall of said stator is at least partly covered by a molded material.

6. A synchronous electrodynamic machine as recited in claim 1 wherein said rotor comprises:
   (a) a shaft which is mounted in said bearings;
   (b) non-magnetic flanges extending radially outwardly from said shaft at points coincident with the axial ends of said stator;
   (c) a plurality of magnetic sheets slipped on said shaft; and
   (d) a plurality of braces extending between said flanges and functioning to keep said magnetic sheets tight.

7. A synchronous electrodynamic machine as recited in claim 6 wherein one of said flanges is integral with said shaft.

8. A synchronous electrodynamic machine as recited in claim 6 wherein:
   (a) said permanent magnets are disposed in radially oriented slots in said magnetic sheets, which slots communicate with the outer cylindrical surface of said rotor;
   (b) said permanent magnets do not extend radially outwardly to the outer cylindrical wall of said rotor; and
   (c) the portions of said slots which are not filled by said permanent magnets are filled by a molded material.

9. A synchronous electrodynamic machine as recited in claim 8 wherein:
   (a) said flanges extend radially outwardly from said shaft by the same amount as said magnetic sheets and
   (b) the axially outer faces of said flanges are smooth and continuous.

* * * * *